United States Patent
Kubota

(10) Patent No.: US 9,670,860 B2
(45) Date of Patent: Jun. 6, 2017

(54) ABNORMALITY DIAGNOSING APPARATUS OF INTAKE AIR TEMPERATURE SENSOR, AND ABNORMALITY DIAGNOSING METHOD

(71) Applicant: NISSAN MOTOR CO., LTD., Yokohama-shi, Kanagawa (JP)

(72) Inventor: Mitsuhiko Kubota, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 239 days.

(21) Appl. No.: 14/440,477

(22) PCT Filed: Oct. 17, 2013

(86) PCT No.: PCT/JP2013/078161
§ 371 (c)(1),
(2) Date: May 4, 2015

(87) PCT Pub. No.: WO2014/069243
PCT Pub. Date: May 8, 2014

(65) Prior Publication Data
US 2015/0285176 A1 Oct. 8, 2015

(30) Foreign Application Priority Data
Nov. 5, 2012 (JP) ................................. 2012-243659

(51) Int. Cl.
*G01F 1/68* (2006.01)
*F02D 41/22* (2006.01)
(Continued)

(52) U.S. Cl.
CPC ............ *F02D 41/222* (2013.01); *G01F 1/68* (2013.01); *F02B 33/44* (2013.01);
(Continued)

(58) Field of Classification Search
CPC ............ F02B 33/44; F02D 2200/0414; F02D 41/0007; F02D 41/222; G01F 1/68; Y02T 10/40
See application file for complete search history.

(56) References Cited

U.S. PATENT DOCUMENTS 5,544,639 A * 8/1996 Shouda .................. F01N 9/005
                                                                                   123/676
8,515,710 B2 * 8/2013 Wang .................. F02D 41/1446
                                                                                   374/144
(Continued)

FOREIGN PATENT DOCUMENTS

| | | |
|---|---|---|
| JP | 2-104943 A | 4/1990 |
| JP | 6-346778 A | 12/1994 |

(Continued)

*Primary Examiner* — Freddie Kirkland, III
(74) *Attorney, Agent, or Firm* — Foley & Lardner LLP

(57) ABSTRACT

An abnormality diagnosis apparatus applied to an internal combustion engine, including a supercharger, a communication path, an opening/closing valve, and a downstream intake air temperature sensor and not having a cooling device on the upstream side of the downstream intake air temperature sensor and conducting abnormality diagnosis of the downstream intake air temperature sensor diagnoses that the downstream intake air temperature sensor is abnormal if an operation state of the internal combustion engine is a low load and a low rotation region and a detected value of the downstream intake air temperature sensor is at a predetermined high temperature or more and prohibits the subsequent abnormality diagnosis if the operation state of the internal combustion engine becomes a higher load or a higher rotation than the low load and low rotation region.

4 Claims, 4 Drawing Sheets

(51) Int. Cl.
*F02D 41/00* (2006.01)
*F02B 33/44* (2006.01)

(52) U.S. Cl.
CPC .. *F02D 41/0007* (2013.01); *F02D 2200/0414* (2013.01); *Y02T 10/40* (2013.01)

(56) References Cited

U.S. PATENT DOCUMENTS

| | | | | |
|---|---|---|---|---|
| 8,608,374 | B2* | 12/2013 | Hamama | F02D 41/222 374/1 |
| 9,026,399 | B2* | 5/2015 | Nagoshi | F02D 41/222 702/183 |
| 9,114,796 | B2* | 8/2015 | Martin | B60W 10/06 |
| 2016/0160777 | A1* | 6/2016 | Hanawa | F02D 41/1446 374/144 |

FOREIGN PATENT DOCUMENTS

| | | |
|---|---|---|
| JP | 10-153125 A | 6/1998 |
| JP | 2000-282930 A | 10/2000 |
| JP | 2010-138796 A | 6/2010 |

* cited by examiner

US 9,670,860 B2

ABNORMALITY DIAGNOSING APPARATUS OF INTAKE AIR TEMPERATURE SENSOR, AND ABNORMALITY DIAGNOSING METHOD

TECHNICAL FIELD

The present invention relates to abnormality diagnosis of an intake air temperature sensor provided in an intake air passage of an internal combustion engine.

BACKGROUND ART

JP2010-138796A discloses an abnormality diagnosing apparatus for diagnosing presence of abnormality of two intake air temperature sensors provided in an upstream intake air passage and a downstream intake air passage of a turbocharger, respectively, in an internal combustion engine with turbocharger.

In this abnormality diagnosing apparatus, in order to ensure diagnosis accuracy of abnormality diagnosis, the abnormality diagnosis of the intake air temperature sensor is conducted in a state in which a supercharging pressure is less than a predetermined pressure is kept for a predetermined period of time and a detected value of the downstream intake air temperature sensor is made stable alter lowering of a downstream intake air temperature is finished.

SUMMARY OF INVENTION

However, if the above-described abnormality diagnosing method is applied to an internal combustion engine provided with a supercharger and a passage for bypassing the supercharger and not having an intercooler between the supercharger and the downstream intake air temperature sensor, there is a problem of misdiagnosis.

That is because, since the intake air whose temperature has risen after passage through the supercharger returns to an upstream side of the supercharger via a bypass passage, the downstream intake air temperature does not fall stably or even rises in some cases after the supercharging pressure lowers.

The present invention was made in view of such technical problems and has an object to provide an abnormality diagnosing apparatus of an intake air temperature sensor capable of abnormality diagnosis of the intake air temperature sensor while diagnosis accuracy is ensured in an internal combustion engine with a supercharger.

According to an aspect of the present invention, an abnormality diagnosing apparatus of an intake air temperature sensor applied to an internal combustion engine, including a supercharger provided in an intake air passage and driven by an output of the internal combustion engine, a communication path allowing an upstream side and a downstream side of the supercharger to communicate with each other, an opening/closing valve for opening/closing the communication path, and an upstream intake air temperature sensor and a downstream intake air temperature sensor for detecting intake air temperatures on the upstream side and the downstream side of the supercharger and not having a device for cooling the intake air on the upstream side of the downstream intake sir temperature sensor is provided.

The abnormality diagnosing apparatus diagnoses that the downstream intake air temperature sensor is abnormal if an operation state of the internal combustion engine is in a low load and low rotation region and a detected value of the downstream intake air temperature sensor is at a predetermined high temperature or more.

Moreover, the abnormality diagnosing apparatus prohibits the subsequent abnormality diagnosis if the operation state of the internal combustion engine becomes a higher load or a higher rotation than the low load and low rotation region.

DESCRIPTION OF EMBODIMENTS

An embodiment of the present invention will be described below by referring to the attached drawings.

Figure 1:
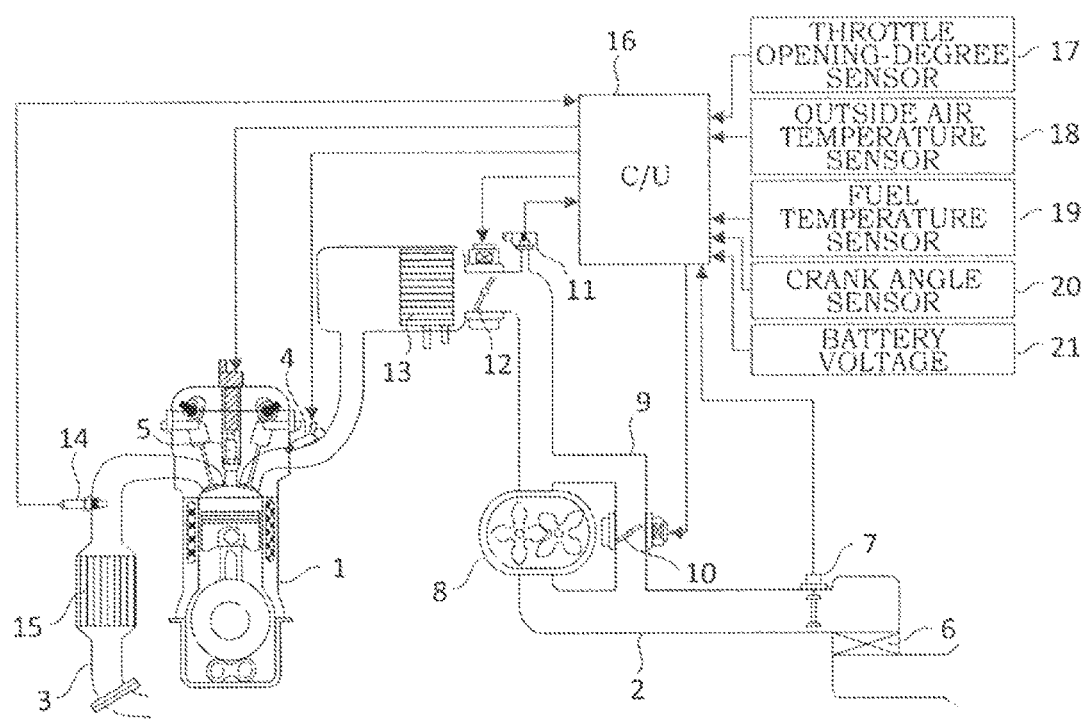
FIG. 1 is a schematic configuration diagram of an engine to which the present invention is applied.

FIG. 1 illustrates a schematic configuration of a gasoline engine according to the embodiment of the present invention. An engine 1 has an intake air passage 2 leading intake air to each cylinder and an exhaust air passage 3 for exhausting exhaust gas from each cylinder connected. Moreover, a fuel injection injector 4, an ignition plug 5 and the like are provided.

On the intake air passage 2 of the engine 1, an air cleaner 6, an upstream intake air temperature sensor 7, a supercharger 8 driven by an output of the engine 1 and supercharging the intake air, a bypass passage 9 for returning the intake air from a downstream side to an upstream side of the supercharger 8, an air bypass valve 10 for opening/closing the bypass passage 9, a downstream intake air temperature sensor 11, a throttle valve 12, an intercooler 13 for cooling the intake air and the like are disposed in order from the upstream side. On the exhaust air passage 3 of the engine 1, an O2 sensor 14, a three-way catalyst 15 and the like are disposed in order from the upstream side.

The air bypass valve 10 is a valve for controlling a supercharging pressure of the supercharger 8. If the supercharging pressure reaches a predetermined upper limit pressure, for example, the valve is opened so as to release the supercharging pressure so that the supercharging pressure does not rise any more. Moreover, if supercharging is not performed in accordance with an operation state of the engine 1, the valve is opened so as to release the supercharging pressure.

In a state in which the air bypass valve 10 is open, the supercharged intake air returns through the bypass passage 9 from the downstream side to the upstream side of the supercharger 8 of the intake air passage 2. Therefore, after the air bypass valve 10 is opened, the supercharging pressure does not rise or rather lowers.

A control unit 16 executes various types of control of the engine 1. Into the control unit 16, detection signals from a throttle opening-degree sensor 17, an outside air temperature sensor 18, a fuel temperature sensor 19, a crank angle sensor 20 and the like and a battery voltage 21 and the like are inputted.

The control unit 16 controls discharge timing (ignition timing) to the ignition plug 5, a fuel injection amount of the fuel injection injector 4, fuel injection timing and the like in accordance with the operation state of the engine 1 or controls opening degrees of the throttle valve 12 and the air bypass valve 10 by executing various control programs on the basis of the detection signals from various sensors and the like.

Moreover, in this embodiment the control unit 16 executes abnormality diagnosis processing for the upstream intake air temperature sensor 7 and the downstream intake air temperature sensor 11 as targets. This is because, since control is configured to be executed in accordance with the operation state of the engine 1 on the basis of the detection signals of the various sensors and the like as described above, it is important to confirm that the two intake air temperature sensors function normally.

Figure 2:
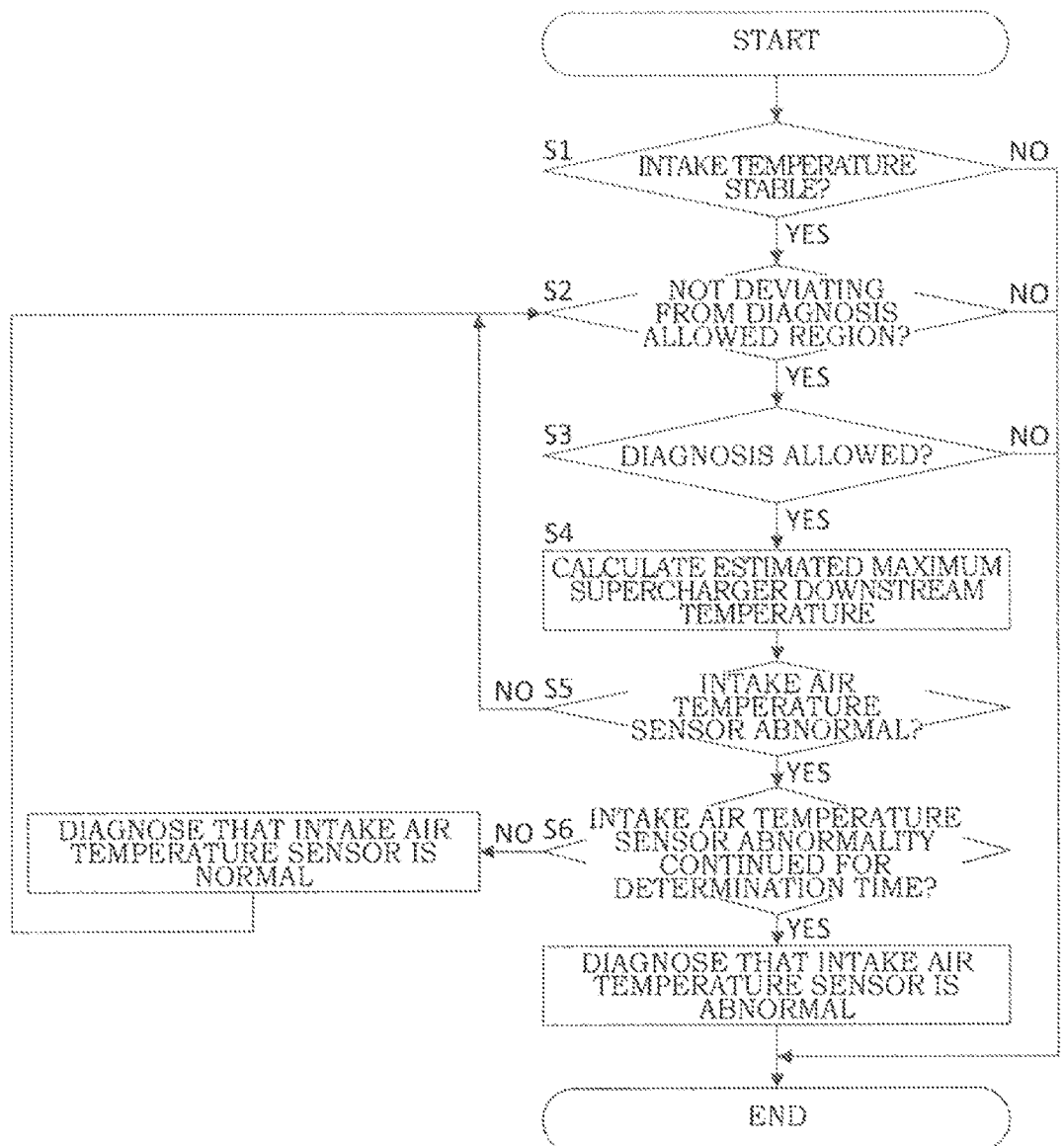
FIG. 2 is a flowchart illustrating an abnormality diagnosis procedure of an intake air temperature sensor according to an embodiment of the present invention.

In this embodiment, in order to ensure diagnosis accuracy while abnormality diagnosis of the intake air temperature sensors is made possible, the abnormality diagnosis is conducted in accordance with a procedure illustrated in the flowchart in FIG. 2. Contents of the abnormality diagnosis of the intake air temperature sensors will be described below by referring to that.

This calculation routine is repeatedly executed. It is executed at every 100 ms, for example.

At S1, the control unit 16 determines whether or not an intake air temperature at start of the engine 1 is stable. The state in which the intake air temperature is stable is a state in which a difference between a supercharger upstream temperature and a supercharger downstream temperature is at a diagnosis allowed threshold value or less determined in advance by an experiment or the like. The supercharger upstream temperature is a detected value of the upstream intake air temperature sensor 7. Moreover, the supercharger downstream temperature is a detected value of the downstream intake air temperature sensor 11.

If the Intake air passage 2, the supercharger 8 and the like are at a high temperature due to an influence of the previous operation of the engine 1, the temperature of the intake air rises while passing through the intake air passage 2 and thus, the temperature difference at start of the engine 1 becomes large. The abnormality diagnosis of the intake air temperature sensor is conducted by comparing the detected value of the outside air temperature sensor 18 or the predetermined threshold value and the detected value of the intake air temperature sensor and thus, when the abnormality diagnosis is conducted if the temperature difference is large, misdiagnosis can occur. Therefore, by setting the temperature difference acquired by an experiment which makes a misdiagnosis if the abnormality diagnosis is conducted to the above-described diagnosis allowed threshold value, for example, misdiagnosis can be prevented.

When the difference between the supercharger upstream temperature and the supercharger downstream temperature at start of the engine 1 is at the diagnosis allowed threshold value or less, the control unit 16 determines that the intake air temperature is stable and the processing proceeds to the subsequent step (S1: YES). If the difference between the supercharger upstream temperature and the supercharger downstream temperature at start of the engine 1 is larger than the diagnosis allowed threshold value, the subsequent abnormality diagnosis is prohibited, and the abnormality diagnosis routine is finished (S1: NO).

At S2, the control unit 16 determines whether or not the operation state of the engine 1 does not deviate from the diagnosis allowed region. The diagnosis allowed region is a region in which the operation state of the engine 1 is low load and low rotation.

If the operation state of the engine 1 becomes a higher load than a low load region, the subsequent abnormality diagnosis is prohibited until the operation (trip) is finished, and the abnormality diagnosis routine is finished (S2: NO). A state in which the operation state of the engine 1 is a higher load than the low load region refers to a state in which cylinder filling efficiency of the engine 1 exceeds an upper limit cylinder filling efficiency.

Figure 3:
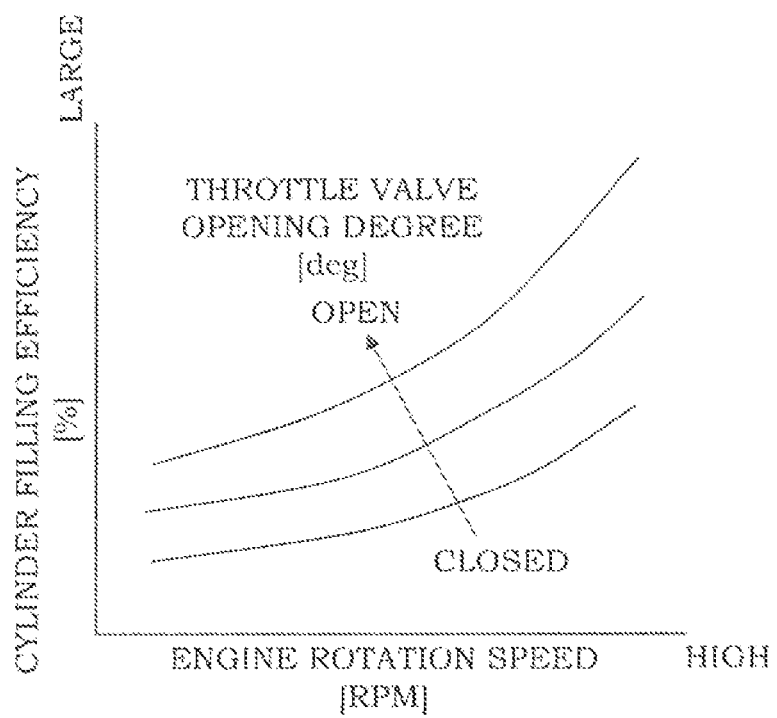
FIG. 3 is a characteristic map illustrating cylinder filling efficiency.

The cylinder filling efficiency is calculated on the basis of a throttle valve opening degree and an engine rotation speed by referring to a characteristic map in FIG. 3 measured in advance by using an experiment. Moreover, the upper limit cylinder filling efficiency is a cylinder filling efficiency determined in advance by an experiment or the like by considering the configuration of the engine 1, driving condition and the like. Misdiagnosis can be prevented by setting the upper limit cylinder filling efficiency on the basis of the operation state of the engine 1 acquired by an experiment which makes a misdiagnosis if the abnormality diagnosis is conducted, for example.

Moreover, if the operation state of the engine 1 becomes a higher rotation than a low rotation region, too, the subsequent abnormality diagnosis is prohibited until the operation (trip) is finished, and the abnormality diagnosis routine is finished (S2: NO). The state in which the operation state of the engine 1 is high rotation than the low rotation region is a state in which a rotation speed of the engine 1 exceeds an upper limit engine rotation speed. The rotation speed of the engine 1 is calculated on the basis of a detected value of the crank angle sensor 20.

The upper limit engine rotation speed is an engine rotation speed determined in advance by an experiment or the like by considering the configuration of the engine 1, driving condition and the like. Misdiagnosis can be prevented by setting the upper limit engine rotation speed on the basis of the operation state of the engine 1 acquired by an experiment which makes a misdiagnosis if the abnormality diagnosis is conducted, for example.

If the operation state of the engine 1 has not become the high load or high rotation, the control unit 16 proceeds processing to the subsequent step (S2: YES).

At S3, the control unit 16 determines whether or not to allow the abnormality diagnosis.

If a battery voltage 21 is at a stable battery voltage or more, a voltage of the throttle opening degree sensor 17 is at a disconnection determination voltage or less, and the voltage of the throttle opening degree sensor 17 is at a short-circuit determination voltage or more, the control unit 16 proceeds the processing to the subsequent step (S3: YES).

If any one or more of the above-described three conditions are not satisfied, the subsequent abnormality diagnosis is prohibited, and the abnormality diagnosis routine is finished (S3: NO).

The condition of the battery voltage 21 is set as a condition for allowing diagnosis since if the battery voltage 21 lowers, engine auxiliary machines such as an air bypass valve 10 and the like do not operate normally. Moreover, the condition of the throttle opening degree sensor 17 is set as a condition for allowing diagnosis since if the throttle opening degree sensor 17 is disconnected or short-circuited, the operation state of the engine 1 changes.

At S4, the control unit 16 calculates an estimated maximum supercharger downstream temperature.

The estimated maximum supercharger downstream temperature is acquired as a sum of a value obtained by subtracting a standard supercharger upstream temperature from the supercharger upstream temperature and a maximum supercharger downstream temperature.

Figure 4:
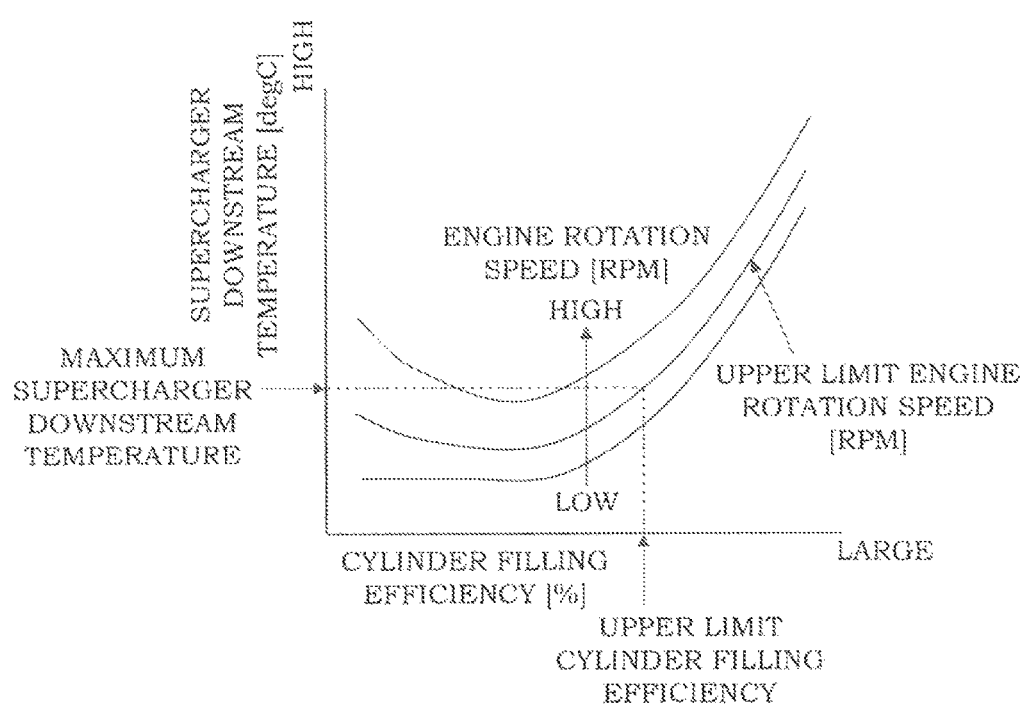
FIG. 4 is a characteristic map illustrating a supercharger downstream temperature.

The standard supercharger upstream temperature is a supercharger upstream temperature at measurement in the characteristic map in FIG. 4 measured in advance by an experiment. The maximum supercharger downstream temperature is calculated on the basis of the upper limit engine rotation speed and the upper limit cylinder filling efficiency by referring to the characteristic map in FIG. 4. That is, the estimated maximum supercharger downstream temperature is an estimated value of the maximum supercharger downstream temperature that can be taken in the operation state in which the abnormality diagnosis is conducted.

At S5, the control unit 16 determines presence of abnormality of the intake air temperature sensor.

The control unit 16 compares the supercharger downstream temperature with the estimated maximum supercharger downstream temperature and if the supercharger downstream temperature is higher than the estimated maximum supercharger downstream temperature, it determines that there is abnormality in the intake air temperature sensor and proceeds the processing to the subsequent step (S5: YES). Moreover, if the supercharger downstream temperature is compared with the supercharger upstream temperature and the supercharger downstream temperature is lower than the supercharger upstream temperature, it also determines that there is abnormality in the intake air temperature sensor and proceeds the processing to the subsequent step (S3: YES).

If the supercharger downstream temperature is at the estimated maximum supercharger downstream temperature or less and the supercharger downstream temperature is at the supercharger upstream temperature or more, it is determined that there is no abnormality in the intake air temperature sensor, and the processing is proceeded to S2 (S5: NO).

Since detected values of the sensors and operation amounts of the devices are varied, a value obtained by adding detection variation of the upstream intake air temperature sensor 7, detection variation of the downstream intake air temperature sensor 11, downstream intake air temperature variation caused by discharge amount variation of the supercharger 8 and the like to the estimated maximum supercharger downstream temperature may be compared with the supercharger downstream temperature.

At S6, the control unit 16 determines whether or not the intake air temperature sensor abnormality has continued for a determination period of time.

If a state with abnormality continues for the predetermined determination period of time after it is determined that there is abnormality in the intake air temperature sensor at S5, the control unit 16 diagnosis that the intake air temperature sensor is abnormal and finishes the abnormality diagnosis routine (S6: YES).

If the state with abnormality does not continue for the predetermined determination period of time after it is determined that there is abnormality in the intake air temperature sensor at S5, it is diagnosed that the intake air temperature sensor is normal, and the processing is proceeded to S2 (S6: NO).

Even if it is determined that there is abnormality in the intake air temperature sensor at S5, the diagnosis that the intake air temperature sensor is abnormal is not finalized immediately, and a failure diagnosis routine is repeatedly executed so that misdiagnosis can be prevented.

Moreover, when it is diagnosed that the intake air temperature sensor is abnormal, if an absolute value of a difference between an outside air temperature detected by the outside air temperature sensor 18 and the supercharger upstream temperature is not more than the supercharger upstream temperature determination threshold value determined in advance by an experiment or the like, the control unit 16 diagnoses that the downstream intake air temperature sensor 11 is abnormal.

If the absolute value of the difference between the outside air temperature and the supercharger upstream temperature is larger than the supercharger upstream temperature determination threshold value, it is diagnosed that the upstream intake air temperature sensor 7 is abnormal.

The supercharger upstream temperature determination threshold value may be set by considering detection variation of the outside air temperature sensor 18, detection variation of the upstream intake air tempera tore sensor 7 and the like.

According to this embodiments if the operation state of the engine 1 becomes a higher load or a higher rotation than the low load and low rotation region in which the abnormality diagnosis is conducted, the subsequent abnormality diagnosis of the intake air temperature sensor is prohibited until the operation (trip) is finished. Therefore, in a state in winch the intake air supercharged by the supercharger 8 and whose temperature has risen returns from the downstream side to the upstream side of the supercharger 8 via the bypass passage 9, abnormality diagnosis of the intake air temperature sensor is not conducted and thus, misdiagnosis can be prevented.

Moreover, since the estimated value of the maximum supercharger downstream intake air temperature that can be taken in the low load and low rotation region is compared with the supercharger downstream intake air temperature, even if the intake air temperature on the downstream side of the supercharger 8 rises by supercharging or return of the intake air from the bypass passage 9 in the low load and low rotation region, the abnormality diagnosis of the intake air temperature sensor can be conducted without making misdiagnosis.

Moreover, if the intake air temperature is not stable at start of the engine 1, the abnormality diagnosis of the intake air temperature sensor is prohibited. Therefore, since the abnormality diagnosis of the intake air temperature sensor is not conducted in a state in which the intake air temperature rises under an influence of the previous operation of the engine 1, misdiagnosis can be prevented.

The embodiment of the present invention has been described above, but the embodiment illustrates only a part of an application example of the present invention and is not intended to limit the technical scope of the present invention to the specific example of the above-described embodiment.

For example, in the above-described embodiment, the present invention is applied to a gasoline engine but it may be applied to a diesel engine.

Moreover, in the above-described embodiment, the intercooler 13 is provided between the throttle valve 12 of the intake air passage 2 and the engine 1, but it may be configured without the intercooler 13.

Moreover, in the above-described embodiment, the difference between the supercharger upstream temperature and the supercharger downstream temperature is used in order to determine whether or not the intake air temperature is stable at S1, but it may be determined whether or not the intake air temperature is stable on the basis of a period of time from stop of the engine 1 to start.

Moreover, in the above-described embodiment, which of the upstream intake air temperature sensor 7 and the downstream intake air temperature sensor 11 is abnormal is diagnosed by using the difference between the outside air temperature and the supercharger upstream temperature, but a fuel temperature detected by the fuel temperature sensor 19 may be used instead of the outside air temperature.

With respect to the above description, the contents of application No. 2012-243659, with a filing date of Nov. 5, 2012 in Japan, are incorporated herein by reference.

The invention claimed is:

1. An abnormality diagnosing apparatus of an intake air temperature sensor applied to an internal combustion engine, including a supercharger provided in an intake air passage and driven by an output of the internal combustion engine, a communication path allowing an upstream side and a downstream side of the supercharger in the intake air passage to communicate with each other, an opening/closing valve adapted to open/close the communication path, and a downstream intake air temperature sensor adapted to detect the intake air temperature on the downstream side of the supercharger in the intake air passage and not having a cooling device for cooling the intake air on the upstream side of the downstream intake air temperature sensor of the intake air passage and conducting abnormality diagnosis of the downstream intake air temperature sensor, comprising:

an abnormality diagnosing unit configured to diagnose that the downstream intake air temperature sensor is abnormal if an operation state of the internal combustion engine is in a low load and low rotation region and a detected value of the downstream intake air temperature sensor is at a predetermined high temperature or more; and an abnormality diagnosis prohibiting unit configured to prohibit the subsequent abnormality diagnosis if the operation state of the internal combustion engine becomes a higher load or a higher rotation than the low load and low rotation region.

2. The abnormality diagnosing apparatus of an intake air temperature sensor according to claim 1, wherein an estimating unit configured to estimate a maximum intake air temperature on the downstream side of the supercharger that can be taken in the low load and low rotation region is provided; and the predetermined high temperature is an estimated maximum supercharger downstream temperature estimated by the estimating unit.

3. The abnormality diagnosing apparatus of an intake air temperature sensor according to claim 1, the internal combustion engine further comprising:

an upstream intake air temperature sensor adapted to detect an intake air temperature on the upstream side of the supercharger in the intake air passage, wherein the abnormality diagnosis prohibiting unit is configured to prohibit the abnormality diagnosis if a difference between a detected value of the upstream intake air temperature sensor and a detected value of the downstream intake air temperature sensor at start of the internal combustion engine is not a diagnosis allowed threshold value or less.

4. An abnormality diagnosing method applied to an internal combustion engine, including a supercharger provided in an intake air passage and driven by an output of the internal combustion engine, a communication path allowing an upstream side and a downstream side of the supercharger in the intake air passage to communicate with each other, an opening/closing valve adapted to open/close the communication path, and a downstream intake air temperature sensor adapted to detect the intake air temperature on the downstream side of the supercharger in the intake air passage and not having a cooling device for cooling the intake air on the upstream side of the downstream intake air temperature sensor of the intake air passage and conducting abnormality diagnosis of the downstream intake air temperature sensor, comprising:

diagnosing that the downstream intake air temperature sensor is abnormal if an operation state of the internal combustion engine is in a low load and low rotation region and a detected value of the downstream intake air temperature sensor is at a predetermined high temperature or more; and prohibiting the subsequent abnormality diagnosis if the operation state of the internal combustion engine becomes a higher load or a higher rotation than the low load and low rotation region.

\* \* \* \* \*